April 22, 1941.  J. W. KAMERER  2,239,527
MULTIPLE LAMINATED GLASS
Filed July 12, 1937
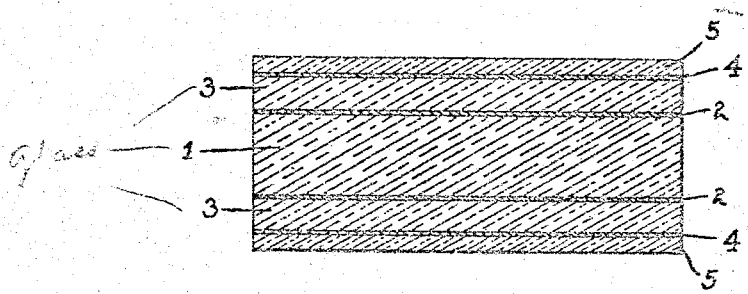
INVENTOR.
JAMES W. KAMERER
BY Bradley & Bee
ATTORNEYS.

Patented Apr. 22, 1941

2,239,527

UNITED STATES PATENT OFFICE 2,239,527

MULTIPLE LAMINATED GLASS

James W. Kamerer, New Kensington, Pa., assignor to Pittsburgh Plate Glass Company, Allegheny County, Pa., a corporation of Pennsylvania Application July 12, 1938, Serial No. 218,785

3 Claims. (Cl. 49—92)

The present invention relates to laminated safety glass and more particularly to a multiple safety glass.

The primary object of the invention is the provision of a safety glass of special value for use in glazing installations wherein maximum resistance to breaking or penetration is required over a wide temperature range.

Other objects and advantages of the invention will be more apparent from the following detailed description of a preferred embodiment thereof.

Multiple safety glass is employed generally in glazing armored cars, cashier and teller cages in banks and in other positions where its superior resistance to bullet penetration is desired. It has heretofore been prepared by bonding together a plurality of glass plates by means of a plastic material such as a cellulosic ester or a resinous compound suitable for the purpose. The plastic, under proper conditions, bonded the plates of glass together with a strong unitary plate capable of withstanding severe impacts and in the event of breakage, it held the fragments together. Unfortunately, however, the strength, flexibility and adhesion of plastics are subject to great variation with changes in temperature and at some extremes a satisfactory composite unit is difficult to obtain.

For example, where a comparatively hard plastic material, such as cellulose nitrate, is used as the reinforcing interlayer between the several plates of glass and the assembly is exposed to temperatures of approximately zero degrees F., the strength and resistance to shattering of the composite plate are relatively low. The plate, however, exhibited excellent protective properties at higher temperatures. In the same manner, the use of a softer plastic material permits the manufacture of a composite plate affording adequate protection at low temperatures, but the assembly is not satisfactory at high temperatures.

Where it is desired to use a laminated glass, for example as a bullet-proof glazing material, in an armored car or truck, it will at once be obvious that the assembly must be able to withstand temperatures varying from approximately 30 degrees below to 120 degrees above zero F. The ordinary multiplate safety glass will not be entirely satisfactory over this wide temperature range.

The present invention involves the provision of a multiplate safety glass comprising plies or layers of a hard and a soft bonding agent interposed between several plates of glass and separated from each other thereby. In such construction, at either extreme of the atmospheric temperature range, one or more of the layers of bonding material still retains sufficient reinforcing and bonding power to hold together some of the glass plates as a relatively strong unit and to prevent detachment of glass fragments in event of breakage.

In the accompanying drawing, the single figure is a vertical sectional view through a laminated plate assembled in accordance with the provisions of the invention.

As shown in the drawing, a central plate 1 of glass is coated upon both faces with layers 2 of a relatively soft plastic material. Intermediate plates 3 of glass are superposed thereon and the outer surfaces thereof are covered with layers 4 of a second relatively hard plastic material. Cover plates 5 of glass are applied over the plastic layers 4.

The various plates of glass are preferably of graduated thickness, the heaviest plate forming the middle and the subsequent plates being relatively thinner. In this way it is possible to maintain the total thickness of the unit at a minimum without unduly impairing its resistance to bullet penetraton. Although this is the preferred arrangement of the glass plates, other thicknesses and combinations could be employed, but with less satisfactory results.

The plastic material forming the layers 2 is preferably a vinyl acetal resin so plasticized that it will retain its plastic properties at low temperatures. A polymerized incomplete vinyl acetal resin substantially equivalent to that produced by treating from 2½ to 8 moles of polyvinyl alcohol with 1 mole of a saturated aliphatic aldehyde, with which has been admixed a suitable quantity of plasticizer, serves adequately the intended purpose. Manifestly other soft type plastics, as for example, the polymerized acrylic acid ester derivatives, could be substituted for the vinyl acetals, for these compounds also retain their plasticity at low temperatures.

The plastic material forming the intermediate layers 4 is preferably of a comparatively hard type, such as the standard cellulosic derivatives, that is cellulose nitrate or cellulose acetate. These layers 4 provide a strong binder at the higher temperatures which normally will be encountered during the service life of the safety glass.

The unit is assembled in any convenient manner. Ordinarily due to procedural limitations, the central plate 1, the layers of plastic 2 and the intermediate plates 3 are united as a core section and then the layers 4 and the covering plates 5 are applied thereto. Manifestly, however, the same results will be obtained where the various laminae are built up in a continuous process. One of the covering plates 5 and the intermediate plates 3 could be passed along an endless conveyor under mechanism wherein a layer of cement is applied to one face of each plate and a sheet of the hard type resin interposed therebetween. This simple sandwich is then advanced to a position at which a sheet or layer 2 is applied and the central plate 1 of glass superposed thereon. In a similar manner the additional elements are built up until the unit is complete. After the various elements of the unit have been assembled it is subjected to controlled heat and pressure, in order to bond the separate elements together into a composite unit. This operation may be performed by placing the units in an autoclave wherein a fluid pressure of approximately 150 pounds per square inch is developed at a temperature of approximately 250 degrees F. If it is desired, the central core section comprising the plates 1 and 3 and the resin layers 2 may be assembled and laminated in the autoclave and thereafter the composite plate provided with the layers 4 of plastic and the cover plates 5 of glass. A second pressing operation using heated platen or pressure rolls would then be sufficient to attach firmly the additional laminae to the central core.

It will at once be obvious that other combinations of plastic materials and glass plates may be had and various different modifications of the laminating operation resorted to without departing from the spirit of the invention or the scope of the appended claims.

What I claim is:

1. A multiplate safety glass comprising a plate of glass, the opposite faces of which are covered with a layer of a plasticized vinyl acetal resin, two additional plates of glass bonded thereto, layers of a cellulosic plastic material covering the outer faces of the second plates of glass and two plates of glass bonded to the outer layers of plastic material.

2. A multiplate safety glas as defined in claim 1, in which the inner resin layers are of a plasticized polymerized incomplete vinyl acetal resin and the outer plastic layers are of cellulose nitrate.

3. A multiplate safety glass comprising a thick central plate of glass, the opposite faces of which are covered with a layer of a plasticized polymerized incomplete vinyl acetal resin, two intermediate plates of glass of a thickness less than that of the central plate of glass bonded thereto through the medium of the resin layers, layers of cellulose nitrate covering the outer faces of the second layers of glass, and two plates of glass of a thickness less than that of the intermediate plates of glass bonded to the outer layers of cellulose nitrate.

JAMES W. KAMERER.